United States Patent [19]

Butler

[11] 4,320,919
[45] Mar. 23, 1982

[54] AERODYNAMIC VISOR

[75] Inventor: James P. Butler, Lewisville, Tex.

[73] Assignee: Affiliated Hatch and Sunroof, Inc., Dallas, Tex.

[21] Appl. No.: 971,649

[22] Filed: Dec. 21, 1978

[51] Int. Cl.³ .............................................. B62D 35/00
[52] U.S. Cl. ....................................... 296/1 S; 296/91
[58] Field of Search ............... 296/15, 91, 95 R, 95 Q, 296/217

[56] References Cited

U.S. PATENT DOCUMENTS 2,687,328  8/1954  Dieterich .......................... 296/95 R
3,929,369  12/1975  Blair .................................. 296/1 S

OTHER PUBLICATIONS

J. C. Whitney Catalog, p. 89, copywright 1978, Corvette Performance Spoiler.

*Primary Examiner*—Joseph F. Peters, Jr.
*Assistant Examiner*—John A. Carroll
*Attorney, Agent, or Firm*—Hubbard, Thurman, Turner, Tucker & Glaser

[57] ABSTRACT

A visor for automotive use including a plurality of air directing channels for reducing the aerodynamic drag of the visor. The visor is formed from a single sheet of material and the channels are formed by flat bottomed depressions beginning near the front edge of the visor and becoming progressively deeper to a point near the back edge of the visor. From this point, the bottom of the depression abruptly rises back to the visor surface. The depressions have a maximum width near the front edge and taper to half this width near the back edge of the visor. The channels direct air from under the visor through openings formed between the visor and the vehicle and exhaust the air with essentially laminar flow.

4 Claims, 3 Drawing Figures

AERODYNAMIC VISOR

BACKGROUND OF THE INVENTION

This invention relates to visors for use with motor vehicles and more particularly to an improved visor including means for reducing the aerodynamic drag of the visor.

Visors for use with motor vehicles are generally well-known. Such devices are useful for shading the windshield and the driver of the vehicle to thereby improve visibility for the driver. Visors have also been provided in various colors and finishes for decorative effect. A basic visor comprises a generally rectangular sheet of usually opaque material having ends connected to the vehicle at the sides of the windshield and/or having one of the long edges attached to the vehicle along the top edge of the windshield. The other long edge of the sheet is usually positioned by suitable means below and in front of the top of the windshield.

Most vehicles and their windshields are designed to provide somewhat laminar flow of wind over the windshield and the rest of the vehicle to reduce aerodynamic drag when the vehicle is driven at highway speeds. It is quite apparent and well-known that when a conventional visor is attached to the vehicle for its intended purpose, it also acts as an air brake and interferes with the flow of air from the windshield over the top of the vehicle. For highway operation of the vehicle, such as a van or truck, this increased air drag can cause a substantial reduction of fuel mileage and proportional increase in operating costs.

Thus, it is seen that while the use of external visors on motor vehicles is desirable, the aerodynamic drag of such devices is a definite problem.

It is known that some attempts have been made to vent air trapped under the visor. One known attempt was to provide a single large vent near the vehicle body at the center of the visor. Such a vent cannot provide a smooth air flow over the vehicle nor relieve the trapped wind condition over the entire length of the visor.

SUMMARY OF THE INVENTION

Accordingly, an object of the present invention is to provide an improved vehicular visor.

Another object of the present invention is to provide a vehicular visor having a minimum aerodynamic drag.

These, and other objects, are achieved by providing an improved vehicular visor including a plurality of air channels for appropriate wind deflection, for reinforcement, and for spacing of the visor from the vehicle body and windshield. The channels are formed between generally flat bottomed depressions running from the front to the back of the visor, increasing in depth from the front to a point near the back of the visor with the depression bottom abruptly rising to the visor's surface near the back of the visor. The resulting visor directs wind deflected from the vehicle windshield through tapered channels formed between the visor and the vehicle and exhausts the wind with essentially laminar flow over the top of the vehicle.

BRIEF DESCRIPTION OF THE DRAWINGS

The present invention may be better understood by reading the following detailed description of the preferred embodiment with reference to the drawings wherein.

DESCRIPTION OF THE PREFERRED EMBODIMENT

Figure 1:
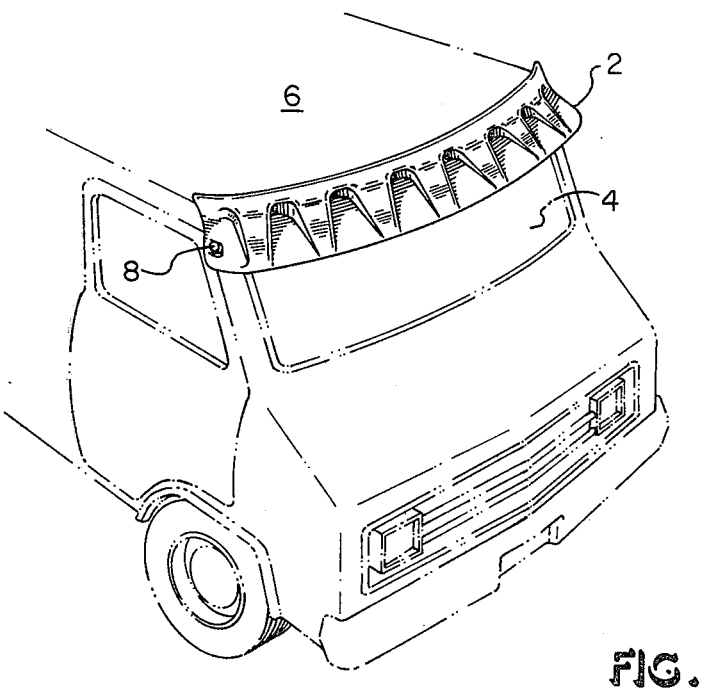
FIG. 1 is a perspective view of a visor acccording to the present invention in place on a motor vehicle.

With reference now to FIG. 1, there is illustrated a visor 2 according to the present invention shown in place on a portion of a motor vehicle including a windshield 4 and a top portion 6. The visor 2 is connected to the vehicle at least at point 8 at the ends of the visor by appropriate bolts or sheet metal screws attached to a frame portion of the vehicle. In typical operation of a motor vehicle, the wind deflected from windshield 4 passes up the windshield to pass over the top 6 of the vehicle. It is this wind which is normally trapped by a visor 2 and results in increased overall aerodynamic drag of the vehicle, which drag is greatly reduced by visor 2.

Figure 2:
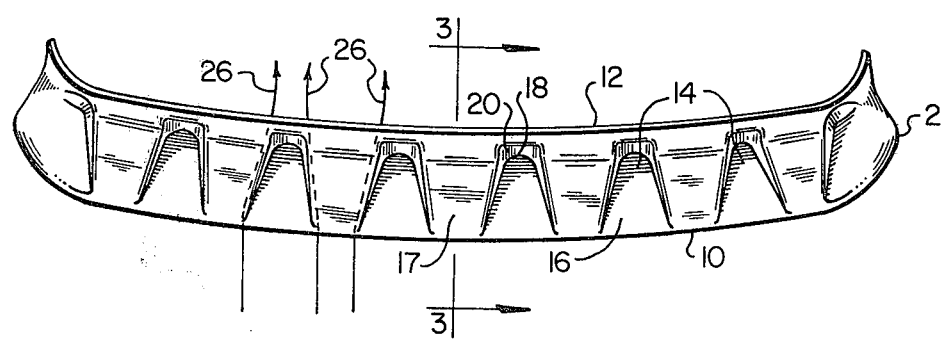
FIG. 2 is a front view of the visor of FIG. 1 with air flow patterns illustrated.
Figure 3:
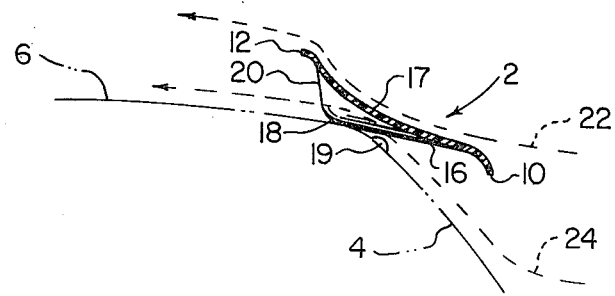
FIG. 3 is a cross-section of FIG. 2 with illustrations of air flow patterns.

With reference now to FIGS. 2 and 3, there is shown top and side sectional views of the visor 2 of FIG. 1. Visor 2 is preferrably made from a resilient opaque plastic material such as ABS, polyvinyl chloride, polystyrene, polystyrenebutadiene copolymer, poly-propylene, a polycarbonate material and the like. In addition to the foregoing materials, the visor can also be stamped from sheet metal and the like. In the preferred form, the visor 2 comprises a single layer of a plastic material having substantially uniform thickness of about 0.1 inch over its entire area. The material selected should be fairly rigid, at least after being stamped or molded into the illustrated shape. The visor 2 is generally rectangular in shape with the longer sides 10 and 12 forming the front and back edges, respectively, of the visor. The length of visor 2 is dictated by the dimensions of the vehicle to which it is attached, but it is typically five to six feet long. The visor illustrated in the drawings is about five and one-half feet long and about ten inches wide.

A number of substantially similar depressions 14 are stamped or molded into the visor 2 and run generally from the front edge 10 to the back edge 12 of the visor. The depressions 14 have a generally flat bottom 16 which is flush with the upper surface 17 of visor 2 near front edge 10 and slopes gradually below the surface of visor 2 to a point 18 near the back of the visor. The bottoms of depressions 14 have a maximum width of about six inches near the front edge 10 and the width reduces to about half the maximum at point 18 near the back edge 12. In the preferred form, the maximum depth of depressions 14 below the surface 17 of visor 2 is about one inch. Preferably the plurality of depressions are essentially identical in size & shape. As illustrated, the preferred embodiment employs eight depressions 14 forming seven air channels for venting air under visor 2. These depressions 14 are preferably evenly distributed along the length of the visor 2. This detailed description is made primarily with respect to the top of visor 2 and for this reason the term "depression" is used to describe elements 14. It is apparent that these elements could be considered ribs or protrusions if viewed from the bottom side of visor 2.

The top surface 17 of visor 2 has a generally scooped shape so that wind encountering this top surface is lifted up and over back edge 12 of the visor and then over the top of the vehicle. This air flow path is indicated by dashed line 22 in FIG. 3. The air flow over the top of the visor structure is essentially laminar flow with little if any turbulence created by the relatively smooth aerodynamic configuration of upper surface 17 of the visor. Wind deflected by the windshield of the vehicle, on the other hand, strikes the bottom surface of visor 2 and if trapped there would cause the increased aerodynamic drag discussed above. But, the improved visor of the present invention provides an efficient route for venting this air between the visor and the vehicle with minimum air drag. The bottom 18 and vertical wall 20 of depressions 14 provide a stand-off between the main portion of visor 2 and the vehicle body near the top of the windshield 4. The portion 18 of depressions 14 provides a convenient mounting surface for attaching the visor 2 to the vehicle top 6 above a molding strip 19, if such attachment is desired. As a result, air channels are formed having depressions 14 as sides, visor 2 as a top, and the windshield 4 and top 6 of the vehicle as a bottom. Wind deflected from the windshield 4 and following the path indicated by the dashed line 24 is therefore directed through these air channels between depressions 14 and deflected by the back of 12 of the visor 2 to flow across the top 6 of the vehicle. Additional indications of the flow paths under the visor 2 are indicated by dashed lines 26 of FIG. 2. It can be seen that the tapering of depressions 14 and resulting flaring of air channels toward top 6 helps direct the deflected air into a uniform, if not wholly laminar, flow pattern across the top 6 of the vehicle. While the tapering of depressions 14 from front to back is preferred, it is believed that substantial reduction in air drag results from venting air through a plurality of distributed air channels. The essentially laminal flow pattern has been found by comparative mileage tests to have significantly reduced the air drag with respect to visors without air channels and also with respect to a visor with a single large air vent in the center.

It is also apparent that the depressions 14 formed along the length of the visor 2 mechanically strengthen the visor against flexing which is important considering the large wind forces to which the visor is subjected.

The depressions 14 may be seen for mechanical purposes as large corrugations extending from the front to the back edge of visor 2. The generally curved shape of the main surface 17 of visor 2 also helps to increase mechanical strength over that achieved with a flat sheet of material.

It will be appreciated that various changes and modifications can be made in the foregoing exemplary design without departing from the spirit and scope of this invention.

I claim:

1. An aerodynamic drag reducing vehicular visor comprising a single sheet of material having a plurality of air channels along its lower surface extending substantially from a front edge to a back edge, each channel formed by, with reference to the top of said visor, a pair of depressions extending substantially from the front edge to the back edge of said visor wherein each of said depressions is flat-bottomed and has a width which decreases from said front edge to a point near said back and then abruptly decreases between said point and said back edge.

2. A visor according to claim 1 wherein the width of each depression near side front edge is about twice the width of each depression near said back edge.

3. In a vehicular visor of the type comprising a generally rectangular sheet of material having a first long edge, forming the back of the visor, adapted for positioning near the top edge of a vehicular windshield and a second long edge, forming the front of the visor, adapted for positioning below and in front of the top edge of said windshield, the improvement comprising a plurality of channels for wind deflection, for reinforcement and for spacing said visor from the windshield, each of said channels formed by, with respect to the top of said visor, a pair of depression extending generally from the front to the back of said visor.

4. The improved vehicular visor of claim 3 wherein said depressions increase in depth and decrease in width from the front edge of said visor to a point near the back edge, and decrease in depth abruptly from said point to said back edge.

* * * * *